Oct. 14, 1958     G. SEULEN     2,856,514
METHOD OF AND APPARATUS FOR THE ELECTRICAL RESISTANCE HEATING
OF SEMI-FINISHED METAL PRODUCTS FOR THE PURPOSE OF
THEIR IMMEDIATE SUBSEQUENT HOT DEFORMATION
Filed Dec. 19, 1955     2 Sheets-Sheet 1
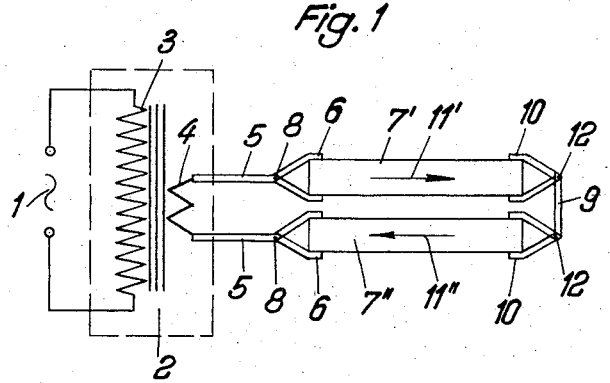
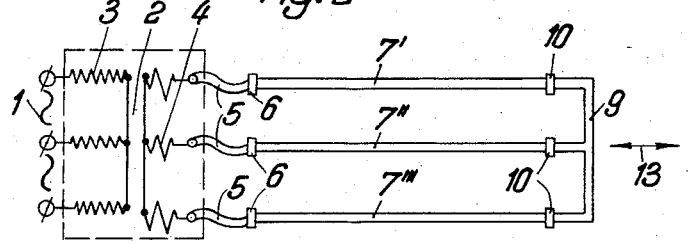
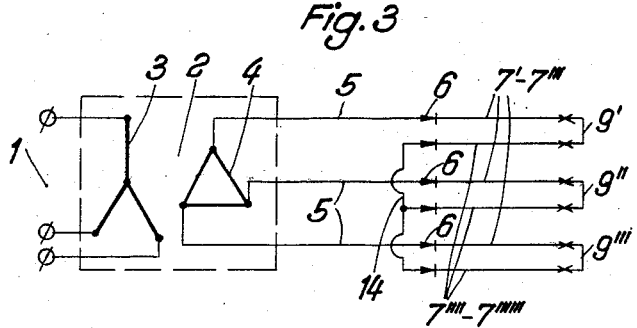
Inventor:
Gerhard Seulen
By Cushman, Darby & Cushman
Attorneys

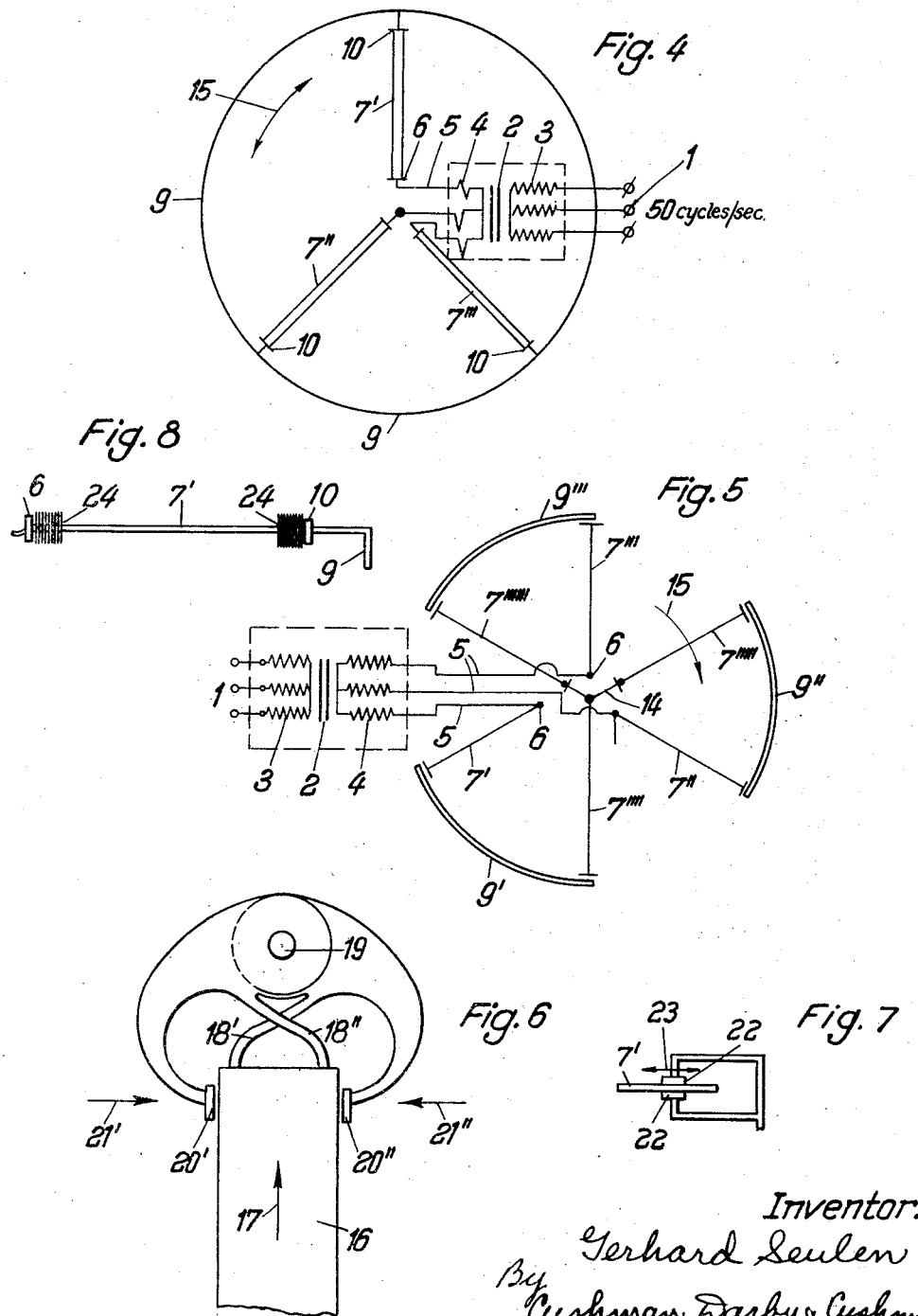

United States Patent Office 2,856,514
Patented Oct. 14, 1958

2,856,514

METHOD OF AND APPARATUS FOR THE ELECTRICAL RESISTANCE HEATING OF SEMI-FINISHED METAL PRODUCTS FOR THE PURPOSE OF THEIR IMMEDIATE SUBSEQUENT HOT DEFORMATION

Gerhard Seulen, Remscheid, Germany, assignor to Deutsche Edelstahlwerke Aktiengesellschaft, Krefeld, Germany Application December 19, 1955, Serial No. 554,042

Claims priority, application Germany December 24, 1954

8 Claims. (Cl. 219—150)

This invention relates to a method of electrical resistance heating of the semi-finished products of ferrous and non-ferrous metals or their alloys, more particularly of steel, for the purpose of subjecting them immediately thereafter to a process of hot deformation.

Whenever in the past the need arose of heating an elongated workpiece by the direct passage of a current of electricity therethrough the said workpiece was joined at either end to an electric conductor so that it completed an electric circuit. The electric leads for conducting the current to the workpiece therefore had to be of a length equal at least to the length of the workpiece it was proposed to heat. It is impossible to work in this way without making special arrangements, unless the electrical resistance of the workpiece considerably exceeds that of the electrical leads. When heating semi-finished articles such as for instance billets, ingots, bars, tubes, or the like, the large cross sectional area such workpieces have by comparison with the cross section of the electrical leads, reduces their resistance, even in the case of steel, to the same order of magnitude as that of the leads. Consequently such an arrangement tends to involve considerable electrical losses in the leads themselves so that heating efficiency is correspondingly low. It may even prove to be necessary to remove the waste heat generated in the leads by cooling them. The amount of lost heat is directly proportional to the length of the leads between the workpiece and the source of electrical power supply.

The question therefore arises how to make the leads as short as may be possible. One method, for instance, would be to heat two workpieces together at the same time and to make one of them serve as the return conductor for the other. One end of each of the two workpieces might then be joined directly to the source of electrical power, the other two ends being inter-connected by a short-circuiting bridge. The lengths of the leads could be thus reduced to a minimum.

However, it is not possible to adopt this particular method if the workpieces are to be subjected at once to a process of hot deformation. A rolling mill train, a press, a hammer and so forth are, as a rule, able to deal with only one workpiece at a time. The duplication of plant for hot deformation is generally prohibitive for reasons of space and of cost. Since two workpieces would always be ready at the required temperature for further processing at the same time, one workpiece would have to be kept waiting until the other had been at least partly processed. The waiting workpiece would then cool down to below the permissible limit unless some kind of heat maintaining equipment were made available, a necessity that would further add to the complications.

To make available to the hot deformation plant one workpiece of appropriate temperature at a time, and at the required working intervals, and to enable the workpiece to be connected to the source of electrical power through leads of the least possible length the present invention consists in connecting at least two workpieces to a source of electrical power and in heating the said workpieces to within different ranges of temperature by directly connecting one end of each of the workpieces to the source of electrical power and taking the return from the other end of one workpiece back through the other workpiece, or alternatively in the case of three or more workpieces, by short circuiting the other ends, heating each workpiece successively to within each different range of temperatures and subjecting each workpiece in turn to hot deformation when it has passed through the successive stages of heating and has reached the requisite temperature for hot deformation. The source of electrical power may be either a transformer, or a generator, or a dry-plate or a mercury arc rectifier, according to whether alternating current of mains or higher frequency or direct current is to be employed. The requisite temperature for hot deformation is reached in a number of stages depending upon the number of workpieces that are being heated, the workpieces being conveyed from one heating station to the next and finally to the hot deformation plant, more particularly to a hot rolling train, at regular intervals of time in conformity with the cycle of operation of the hot deformation plant. At each individual heating station the workpieces are heated to an accurately predetermined temperature, for instance at the first heating station to 600° C., at the second to 1200° C. If provision is made for three or more heating stations the temperature ranges are subdivided accordingly into the requisite number of stages. The temperature ranges given above are only examples and they may be modified to be adapted to the quality of the working material, more particularly the quality of the steel, and the rise of temperature at the individual stations need not necessarily be the same for all stations, that is to say it may be greater or smaller as desired. This is of importance, for example, when heating alloyed steels the temperature rise of which, within the 300° to 600° range, as is known, must be very carefully controlled.

The method according to the present invention can therefore be adapted to supply, at the appropriate intervals of time required by the working cycle of the hot deformation plant, one workpiece of the requisite deformation temperature at a time without wastage of a substantial amount of heat in the short lengths of electrical lead and in the compact short-circuiting bridges.

To perform the method hereinbefore described the present invention proposes to use an apparatus in which the workpieces are located side by side in axial parallelism. In close proximity to the source of electrical power two fixed contact points are provided whereas short circuiting bridges are located at the distant ends of the workpieces. These bridges can be adjusted axially in relation to the workpieces, to enable them to produce the necessary contact pressure. They are also movably arranged so that they can be withdrawn from the workpiece when the latter is to be conveyed from one heating station to the next or released for transportation to the hot deformation plant. Their mobility is also required to enable them to be adapted to workpieces of different lengths and so to avoid the need of adjusting the feeder contacts. This is important when dealing with varying lengths that may have to be handled in the course of the same production programme as well as for the purpose of dealing with different types of workpiece. If desired, the short-circuiting bridges may also be arranged to be raised or lowered or to be angularly swung out in relation to the workpiece axis, whichever may be the more convenient from the point of view of the general lay-out. Such an alternative disposition may be of particular utility if it is desired to remove the workpieces axially for conveyance to the hot deformation plant.

The method according to the present invention may also be performed by means of an arrangement which provides for a radial disposition of the workpieces in the form of a star. The current supply contacts would then be located at the centre of the star and the short-circuiting bridges joining the outer, peripheral, ends of the workpieces would be in the form of a ring or of arcs of a circle.

If the workpieces are placed closely together side by side in parallel they may be moved from heating station to heating station by mechanical, hydraulic, or electro-mechanical, conveying means, such as lifting beams, chains, rollers, or the like. For star arrangements a turntable is a particularly convenient means of moving the workpieces from station to station and to the requisite place for further processing. Roller tracks or the like may adjoin the heating apparatus to enable continuous operation to be maintained from the station where the cold workpiece is first received to the hot deformation plant, such as the rolling mill. The cold workpieces may likewise be moved into position along roller tracks or, alternatively, by some other means of conveyance such as cranes, lifting beams, chutes, trucks or the like.

In apparatus according to the invention it is expedient to use liquid-cooled contacts for the leads as well as for the short-circuiting bridges, devices which are as such already well known. The contacts of the leads and bridges may be placed against the end faces of the workpieces or they may be applied to the workpiece flanks at diametrically opposite points. It is particularly convenient to use the heat expansion of the workpiece both in the axial and radial directions to increase the necessary contact pressure. As a matter of principle at least the contacts of the bridges, or the bridges as a whole, must be mobile as has already been mentioned. Notwithstanding this mobility the contacts may be so constructed that they are capable of yielding, for instance against the pressure of a spring. It is not difficult to adjust the pressure of the spring in such manner that the required contact pressure is automatically maintained. Of course, the springs may be replaced for this purpose by alternative means, such as hydraulic means. A particularly opposite device is a clamp occasionally referred to as a "frog." This grips the sides of the workpiece and any axial expansion of the workpiece increases the counterpressure of the lateral arms against lateral expansion.

Naturally, high contact resistance is experienced at the contact points and this produces an advanced temperature in their vicinity. Only the contacts themselves can be protected against undesirably high temperatures by subjecting them to positive cooling. To prevent the temperatures at the ends of the workpieces during the individual heating stages from rising beyond the permissible limits it is preferred, when the contacts are arranged on either side of the workpiece, to provide for optional adjustability of the distance between the supply contact and the short circuiting bridge contacts in neighbouring heating stations. If this is done, the axial distance between the contacts can be shortened at each successive heating station by comparison with the preceding station, so that the temperature advance due to contact resistance in each heating station can be moved to other points along the length of the workpiece.

If the apparatus according to the present invention is operated with alternating current the temperature distribution along the length of the workpiece can be controlled with a view to securing greater uniformity by placing iron yokes across the workpiece. It is then preferred to build such yokes in the form of laminar parcels of iron sheeting. The iron yokes may partially or wholly embrace the workpiece. They may also be devised to cover the entire length or only individual sections of the workpiece. By such means non-uniformity in temperature distribution due to contact resistance or radiation losses are compensated.

The accompanying drawings diagrammatically illustrate the present invention as embodied in a number of exemplary forms of construction of apparatus for performing the novel method.

Fig. 1 shows a source of electrical power supply 1 which energises an alternating current transformer comprising a primary winding 3 and a secondary winding 4. Two workpieces in the form of billets, bars, tubes, or the like, are joined to the secondary winding 4 by means of leads 5 and contact electrodes 6. The workpieces are indicated by 7' and 7". To facilitate the placement and withdrawal of the workpieces the supply contacts may be pivoted at 8 so that they can be conveniently opened or closed. Located at the distant ends of the workpieces 7' and 7" is a short-circuiting bridge 9 which carries the two contacts 10. The contact arms on the short-circuiting bridge may likewise be mounted to swing about one or two pivots at 12, 12, to permit of their being readily opened and closed. The path of the low voltage, high amperage, current for heating the two workpieces 7 is indicated by the arrows 11' and 11". The close proximity of the two workpieces allows the leads 5 to be restricted to minimum lengths. In actual practice they are so short as to consist practically of the ends of the secondary winding 4 of the transformer 2 so that the supply contacts 6 substantially form one unit with the transformer 2.

If direct current is to be used instead of a low or medium frequency alternating current the transformer 2 must be replaced by a converter, a dry plate, or mercury arc, rectifier.

To adapt the operational cycle of the heating apparatus to the requirements of the hot deformation plant a workpiece 7' is first heated to a temperature of say 600° and then moved transversely into the position of workpiece 7" where its temperature is raised to the final temperature required for hot deformation. At the same time as this workpiece travels to the hot deformation plant a fresh cold workpiece is placed into the position 7'. This procedure continues for as long as heated semi-finished pieces are to be made available to the hot deformation plant.

Fig. 2 illustrates a second alternative form of construction of the apparatus for performing the method according to the invention. In this instance the normal three-phase mains supply indicated at 1 is used to supply the power. The mains feed a three-phase transformer 2 comprising the primaries 3 and the secondaries 4. Three leads 5 are joined to the secondary windings 4, the other ends of the leads carrying the contact electrodes 6. The leads 5 which are of very short length may be rigid or yielding. The contact electrodes 6 may be placed against the end faces or against the flanks of the workpieces. At their distant ends the three workpieces 7', 7", and 7'" are interconnected by the short-circuiting bridge 9. The electrodes 10 may serve as contacts and they may be similar in construction to the contact electrodes 6. The short-circuiting bridge 9 is adjustable in the direction of the arrow 13 and can be moved axially in relation to the workpieces to enable workpieces of different lengths to be heated. Alternatively, the short-circuiting bridge may be modified so as to be capable of transverse movement or of being swung out of contact when the workpieces are about to be moved. Moreover, the contact electrodes 6 may be similarly constructed to enable them to be swung out or moved transversely to the workpiece axis to give sufficient clearance for the removal of the work. The work is heated in individual stages. For instance, the workpiece 7' may be heated from normal room temperature to 400° whereupon all the workpieces are traversed to the next station. The work in station 7' is thereby transferred to station 7" where it is further heated from the assumed 400° to say 800°. At the same time the work that had occupied station 7″ is transferred to the third station 7‴ where its temperature rises from the assumed 800° to say 1200° C. During the same change-over the third workpiece at 7‴ is conveyed to the hot deformation plant and a fresh workpiece is simultaneously placed in position in the first station where it will be heated to the said first-stage temperature of 400° C.

This form of construction of the apparatus according to the present invention is always fed from a source of alternating current supply of a frequency between 10 and 10,000 cycles, though preferably 50 or 60 cycles is used. The internal wiring arrangements within the transformer 2 may be of any well known type such as star-star, star-delta, star-zigzag, or the like. Naturally, the place of the three-phase transformer may in principle also be taken by a transformer with a different number of phases, say two or six phases.

Fig. 3 illustrates a form of construction of the invention in which a three-phase mains supply is again used to feed a transformer 2 comprising a primary winding 3 and a secondary winding 4. The workpieces 7′ to 7‴ are connected with the secondary winding of the transformer through the leads 5 and the contact electrodes 6. The distant ends of the workpieces 7′ to 7‴ are connected by means of short-circuiting bridges 9′, 9″, 9‴ to three further workpieces 7″″ to 7″″″ which at their free ends are interconnected by means of a common short-circuiting bridge 14. In this form of construction of the invention two workpieces are joined in series within each of the three phases. Again the supply leads are extremely short and the short-circuiting bridges 9′ to 9‴ as well as the common bridge are of very compact construction. The various heating stages, there being six such stages in the example as illustrated, are performed by traversing the workpieces from station to station at the end of each stage.

Fig. 4 shows an example of an apparatus in which the workpieces are radially disposed in the shape of a star. Again 1 denotes the 50 cycles/second supply mains, in this case providing a three-phase supply. The transformer 2 comprises the primaries 3 and the secondaries 4. Leads 5 and contacts 6 feed the current to the work 7′, 7″, and 7‴. The contacts 10 are located at the outer, peripheral, ends of the work and they link up with the circular short-circuiting bridge 9. For carrying out the successive heating stages the turntable, not shown, is revolved in the direction indicated by the arrow 15. In this manner each workpiece is moved from one heating station to the next and the workpiece that has reached the final temperature is withdrawn and replaced by a cold workpiece that is moved into the first station.

Fig. 5 illustrates in diagram a form of construction of an apparatus for performing the method according to the invention in which each phase is used to heat two workpieces in series. From the mains supply 1 the heating current is fed through a transformer 2 comprising primary 3 and secondary 4 and via the leads 5 and the contacts 6 to the workpieces 7′ to 7‴. The outer, peripheral, ends of the workpieces 7′ to 7‴ are connected through short-circuiting bridges 9′ to 9‴ in series with the outer, peripheral, ends of workpieces 7″″ to 7″″″ respectively. The inner ends of the pieces 7″″ to 7″″″ are short-circuited by the bridge 14. The work is moved from station to station in the direction of the arrow 15.

The heating process at the various heating stations of the apparatus described is controlled so that the cycle of operations conforms in principle with the method that has been more particularly described with reference to Fig. 1 in such manner that a pre-determined temperature is attained by the work in each individual stage. To facilitate control the current intensity through the workpieces in the individual heating stations may be suitably adjustable.

Fig. 6 shows a special form of construction of the contacts required to feed the current to the work or to short-circuit the ends of the individual pieces. 16 is the end portion of one of the workpieces. By the application of pressure, for instance through the short-circuiting bridges, the workpiece is moved in the direction of the arrow 17. The movement of the workpiece is then transmitted to the lever arms 18′ and 18″ which are pivotally mounted on a common fulcrum 19 and thus urge the diagrammatically shown contact electrodes 20′ and 20″ in the direction of the arrows 21′ and 21″ against the two flanks of the workpiece 16 and so create the desired contact pressure. As the workpiece 16 expands with rising temperature pressure on the levers 18 increases and thereby automatically also increases the contact pressure of the two contacts 20′ and 20″. The drawing does not show the hydraulic, pneumatic, or electro-mechanical means that are incidentally required to open and close the contact electrodes. The supply or short-circuiting leads have also been omitted in the drawing.

The temperature referred to herein are in the centigrade scale.

Fig. 7 shows diagrammatically how the contacts 22 which engage the flanks of the workpiece at the bridging means may be movable in the direction of the arrows 23, and Fig. 8 shows iron yokes 24 of laminar form which at least partially embrace the workpieces and cover at least part of the length thereof.

What I claim is:

1. A method for electrical resistance heating and immediate subsequent working by hot deformation of metallic workpieces which consists in connecting the workpieces so that at least two workpieces complete at least one circuit; inserting the workpieces successively into circuit so that at least two workpieces are simultaneously heated by the direct passage of current therethrough one at one station and another at another station positioning each workpiece at first one said station and then at another said station so that it is heated in stages first through one range and then through a higher range of temperatures and removing and hot-deforming each workpiece in turn when it has passed through the successive stages of heating and has reached the temperature for hot-working.

2. In the method according to claim 1, arranging the workpieces in number corresponding to the number of heating stages successively in physically parallel stations of which one station forms an insertion station and one a removal station with the corresponding end of each station connected to the source of supply and the other ends connected by a short-circuiting bridge and displacing the workpieces transversely from one station to another from the insertion station to the removal station and successively removing the workpieces when heated to the requisite hot-deformation temperature.

3. In the method according to claim 1, disposing the workpieces in number corresponding to the number of heating stations radiating from a centre with the inner ends connected to the source of supply and the outer ends connected by short-circuiting bridging means, displacing the workpieces angularly about a common centre from one heating station to another and finally removing the workpieces successively when heated to the temperature requisite for hot-deformation.

4. A method for the electrical resistance heating and immediate subsequent working by hot deformation of metallic workpieces, the said method consisting in connecting at least one plurality of workpieces to a source of electrical power with each workpiece at a different station, inserting the said workpieces in succession at one station and heating the workpieces simultaneously by the direct passage of current therethrough, displacing the said workpieces from one station to another so that each workpiece is heated successively to within a different range of temperatures, and displacing each workpiece in turn to hot-deformation means and hot-deforming it when it has passed through the successive stages of heating and has reached the requisite temperature for hot-deformation.

5. An apparatus for carrying out the method according to claim 1 comprising contact members in close proximity to one another for connection to a source of supply; electric short-circuit bridging means disposed in spaced arrangement with the contact members, each said member co-operating with said bridging means to form a heating station so that a plurality of heating stations are provided at each of which a workpiece may be heated by the passage of current therethrough and to enable workpieces to be connected in spaced systematic relation to one another each in contact at one end with a different one of said contact members and so that they are short-circuited by the said bridging means at the other end and means for conveying the workpieces cyclically from one station to another for subjection to first one stage of heating at one station and then to at least one other stage of heating through a higher range of temperatures at another station.

6. Apparatus according to claim 5 having contacts adapted to engage the flanks of the workpiece, the contacts that feed the current and the contacts of the short-circuiting bridging means being movable relatively to one another to vary the distance between them.

7. An apparatus according to claim 5 adapted to be used with alternating current, comprising iron yokes of laminar construction which at least partially embrace the workpieces and cover at least part of the length thereof.

8. An apparatus according to claim 5 in which said contact members form an inner arcuate series connected to a central supply point and said bridging means an outer arcuate arrangement so that the respective stations are disposed radially in systematic order to connect the contact members with the bridging means and means for rotating the workpiece about a central axis of the apparatus for angularly displacing the workpieces from one station to another.

References Cited in the file of this patent

UNITED STATES PATENTS

| | | |
|---|---|---|
| 496,775 | Burton et al. | May 2, 1893 |
| 1,436,891 | Moody | Nov. 28, 1922 |
| 1,500,789 | Aoyagi | July 8, 1924 |
| 2,220,535 | Mora | Nov. 5, 1940 |
| 2,666,830 | Dreyfus | Jan. 19, 1954 |

FOREIGN PATENTS

| | | |
|---|---|---|
| 846,527 | France | Jan. 21, 1941 |
| 722,846 | Great Britain | Feb. 2, 1955 |